US005739762A

United States Patent [19]

Kuramatsu et al.

[11] Patent Number: 5,739,762

[45] Date of Patent: Apr. 14, 1998

[54] TIME CORRECTION SYSTEM FOR RADIO SELECTIVE CALLING RECEIVER

[75] Inventors: Hiroyasu Kuramatsu, Shizuoka; Kazuo Morita, Tokyo, both of Japan

[73] Assignee: NEC Corporation, Tokyo, Japan

[21] Appl. No.: 414,489

[22] Filed: Mar. 31, 1995

[30] Foreign Application Priority Data

Apr. 26, 1994 [JP] Japan .................................... 6-088133

[51] Int. Cl.$^{6}$ .............................. G08B 5/22; H04B 7/00; H04B 1/00; H04B 7/24

[52] U.S. Cl. ................................ 340/825.21; 340/825.44; 455/38.1; 455/38.2; 455/51.2; 455/39

[58] Field of Search .......................... 340/825.21, 825.44, 340/825.69, 825.72, 825.54, 825.2; 455/51.2, 39, 38.1, 38.2

[56] References Cited

U.S. PATENT DOCUMENTS

| | | | |
|---|---|---|---|
| 4,414,676 | 11/1983 | Kraul et al. | 375/116 |
| 4,649,538 | 3/1987 | DeLuca et al. | 371/25 |
| 5,261,118 | 11/1993 | Vanderspool, II et al. | 455/51.2 |
| 5,414,419 | 5/1995 | Schwondeman et al. | 340/825.44 |
| 5,444,672 | 8/1995 | Kushita | 368/47 |

FOREIGN PATENT DOCUMENTS 460494 2/1992 Japan .

*Primary Examiner*—Michael Horabik
*Assistant Examiner*—Anthony A. Asongwed
*Attorney, Agent, or Firm*—Whitham, Curtis, Whitham & McGinn

[57] ABSTRACT

A radio selective calling receiver which can improve the precision of a timepiece up to the clock precision of a reception signal from a base station is provided. A bit synchronization section establishes bit synchronization of a digital signal from a reception section to output a reproduction clock. A frequency divider for a timepiece function frequency-divides a reference clock with insufficient precision, which is supplied from a reference clock generation section, by a fixed value while the digital signal is in a frame step-out state. While the digital signal is in a frame synchronized state, the frequency divider variably frequency-divides the reference clock by using a phase correction signal for correcting an internal phase advance/delay, which is output from the bit synchronization section, thereby correcting a gain/loss in time displayed on a display section.

20 Claims, 4 Drawing Sheets

TIME CORRECTION SYSTEM FOR RADIO SELECTIVE CALLING RECEIVER

BACKGROUND OF THE INVENTION

1. Field of the Invention

The present invention relates to a time correction system for a radio selective calling receiver having a timepiece function of displaying time on a display section of the receiver.

2. Description of the Prior Art

Some of the recent radio selective calling receivers have a function of displaying a message and a timepiece function of displaying time, in addition to a call function as an essential function.

A conventional radio selective calling receiver of this type, e.g., a receiver based on a system, such as the POCSAG or NTT system, in which no time information is contained in a radio signal for a selective call as in the ERMES (European Radio Message System), includes a reference clock generation section (oscillator) for constantly generating a reference clock for a time standard, in addition to the local oscillator of a reception section, which intermittently operates for saving battery power. It is, however, required that receivers of this type be manufactured at a low cost. For this reason, it is difficult to use a high-precision oscillator for the above referenced clock generation section. The precision of the above referenced clock is within about ±30 ppm. In using such a reference clock, even if the reference clock has a precision of +10 ppm, the timepiece gains by an error $\Delta T \approx 10^{-5} \times 60$ (seconds)$\times 60$ (minutes)$\times 24$ (hours)$\times 30$ (days)$=25.92$ (seconds) per month.

A technique of allowing a receiver to display an accurate time by using an inexpensive reference clock generation section like the one described above is disclosed in Japanese Patent Laid-Open No. 4-60494 entitled "clock frequency correction system for radio terminal apparatus". In this radio terminal apparatus, when the power supply is turned on, a high-precision clock generated at this time, i.e., a clock based on an output from the above local oscillator, is compared with the above referenced clock. The above referenced clock is then corrected on the basis of this comparison result. When the power supply is turned off, this correcting operation is stopped. With this operation, the precision of a timepiece for measuring time on the basis of the above reference clock is improved.

According to the above clock correction system for the radio terminal apparatus, a clock is compared with the reference clock which generally has a frequency of 100 kHz or less. For this reason, for example, according to the POCSAG system, the above clock having almost the same frequency as that of the referenced clock must be obtained from a high-frequency signal having a frequency as high as approximately 150 MHz. In the above radio terminal apparatus, therefore, expensive circuits such as a mixer and an intermediate-frequency amplifier must be prepared.

SUMMARY OF THE INVENTION

The present invention has been made to solve the above problem in the prior art, and has as its object to provide a time correction system for a radio selective calling receiver which can display an accurate time by using a simple, inexpensive circuit.

According to the present invention, there is provided a time correction system for a radio selective calling receiver which receives a radio signal containing at least a preamble signal, a frame synchronization signal, and a selective call signal, performs call indication when the selective call signal coincides with a self-selective call number, and has a timepiece function of displaying time on a display section, comprising a reception section for generating a digital signal from the radio signal, a bit synchronization section for establishing bit synchronization of the digital signal to generate a reproduction clock, and generating a phase correction signal indicating a phase difference between the reproduction clock and the digital signal, a frame signal detection section for establishing frame synchronization of the digital signal and generating a frame synchronized state signal indicating whether the digital signal is in a frame synchronized state or a frame step-out state, a reference clock generation section for generating a reference clock, a timepiece function frequency divider for receiving the frame synchronized state signal, frequency-dividing the reference clock by a fixed value when the frame synchronized state signal indicates that the digital signal is in a frame step-out state, and variably frequency-dividing the reference clock in accordance with the phase correction signal when the frame synchronized state signal indicates that the digital signal is in a frame synchronized state, thereby setting frequency division outputs as timepiece frequency division clocks, and a time display driving section for causing the display section to display time based on the timepiece frequency division clocks.

In the time correction system for the radio selective calling receiver, the reception section may intermittently receive power at all times except after detection of the preamble signal.

In the time correction system for the radio selective calling receiver, the bit synchronization section may include an edge detector for detecting an edge of the digital signal and generating an edge detection output, a phase comparator for comparing a phase of the edge detection output with that of the reproduction clock, generating the phase correction signal for phase advance correction when the phase of the reproduction clock is advanced, and generating the phase correction signal for phase delay correction when the phase of the reproduction clock is delayed, and a first variable frequency divider for decreasing a frequency division number upon reception of the phase correction signal for phase advance correction, and increasing the frequency division number upon reception of the phase correction signal for phase delay correction.

In the time correction system for the radio selective calling receiver, the timepiece function frequency divider may include a correction control section for receiving the frame synchronized state signal and the phase correction signal and outputting the phase correction signal only when the frame synchronized state signal indicates that the digital signal is in a frame synchronized state, and a second variable frequency divider for decreasing the frequency division number for the reference clock upon reception of the phase correction signal for phase advance correction from the correction control section, increasing the frequency division number for the reference clock upon reception of the phase correction signal for phase delay correction from the correction control section, and frequency-dividing the reference clock by a fixed value when the phase correction signal is not received.

BRIEF DESCRIPTION OF THE DRAWINGS

FIG. 4 is a timing chart for explaining a bit synchronizing operation of the bit synchronization section 103 in a state wherein the phase of a reproduction clock d is delayed with respect to that of a digital signal a; and FIG. 5 is a timing chart for explaining a bit synchronizing operation of the bit synchronization section 103 in a state wherein the phase of the reproduction clock d is advanced with respect to that of the digital signal a.

DETAILED DESCRIPTION OF PREFERRED EMBODIMENT

The present invention will be described below with reference to the accompanying drawings.

Figure 1:
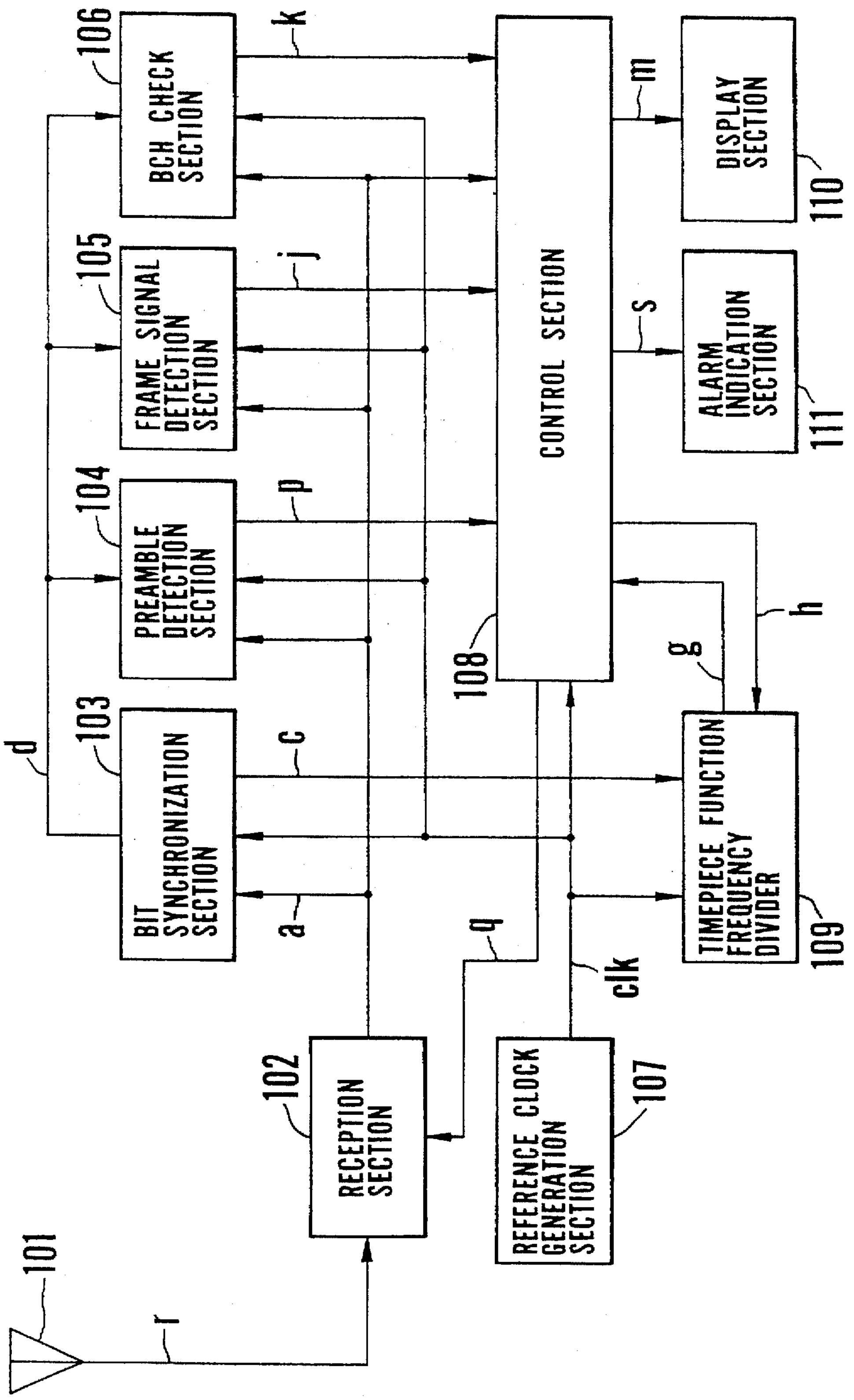
FIG. 1 is a block diagram showing the arrangement of a radio selective calling receiver according to an embodiment of the present invention.

FIG. 1 is a block diagram showing the arrangement of a radio selective calling receiver according to an embodiment of the present invention.

An antenna 101 receives a radio signal r, typically a signal in, e.g., a 150 MHz band or 280 MHz band, from a base station (not shown) of a paging system based on the POCSAG system. This radio signal r contains a preamble signal at its head portion and other signals such as a frame synchronization signal and a selective call signal, which follow the preamble signal. For example, the transmission rate of the radio signal r is 512 pbs, 1,200 pbs, or 2,400 pbs. An error in the transmission rate of the radio signal r, i.e., a clock error, is within ±10 ppm, or about ±1 ppm in practice. The radio signal r is amplified/demodulated into a digital signal a by a reception section 102. This digital signal a is sent to a bit synchronization section 103, a preamble detection section 104, a frame signal detection section 105, a BCH check section 106, and a control section 108. These circuits 103, 104, 105, 106, and 108 also receive a reference clock clk which is generated by a reference clock generation section 107 to generate, for example, a timing signal. Note that the control section 108 includes hardware such as a ROM for storing a self-selective call number, a microprocessor for performing various types of calculation/control, a RAM, and the like.

The bit synchronization section 103 compares a phase of the digital signal a with a phase of a feedback signal of a reproduction clock d generated by itself from the digital signal a, and outputs the reproduction clock d synchronized in bits with the digital signal a. The reproduction clock d is sent to the preamble detection section 104, the frame signal detection section 105, and the BCH check section 106. The bit synchronization section 103 also generates a phase correction signal c indicating the phase difference between the reproduction clock d and the digital signal a.

The preamble detection section 104 detects a preamble signal from the digital signal a, and supplies a preamble detection signal p to the control section 108. The preamble detection signal p indicates whether a preamble signal is detected. The control section 108 determines the presence/absence of a preamble signal in accordance with the preamble detection signal p. If no preamble signal is present, the control section 108 intermittently supplies power to the reception section 102 by using a power supply control signal q. If the preamble detection signal p indicates the presence of the preamble signal, the control section 108 continuously supplies power to the reception section 102 by using the power supply control signal q. As a result, the reception section 102 can output a frame synchronization signal of the digital signal a.

The frame signal detection section 105 establishes frame synchronization of the digital signal a by using the frame synchronization signal in the digital signal a. The frame signal detection section 105 also outputs a frame synchronized state signal j to the control section 108. The frame synchronized state signal j indicates whether the digital signal a is in a frame step-out state or in frame synchronization. Upon reception of the frame synchronized state signal j indicating that the digital signal a is in frame synchronization, the control section 108 performs control to supply power to the reception section 102 only for a self-frame interval of the digital signal a by using the power supply control signal q.

The BCH check section 106 performs BCH check (code error check of a BCH code) of the digital signal a in a self-frame, and supplies a BCH check signal k to the control section 108. The BCH check signal k indicates G (Good)/NG (No Good) result of this check. Upon reception of the BCH check signal k indicating that the result of the BCH check is "NG", the control section 108 determines that the digital signal a is not a true digital signal, and switches the power supply mode for the reception section 102 to the mode of intermittent power supply in a frame asynchronized state.

If the BCH check signal k indicates "G", the control section 108 receives a selective call signal in the digital signal a and collates the selective call signal with the self-selective call number. If they coincide with each other, the control section 108 drives an alarm indication section 111 by using an alarm command signal s. If a message signal is present in the digital signal a, the control section 108 drives a display section 110 by using a display command signal m to control call notification.

This radio selective calling receiver has a timepiece function causing the display section 110 to display time. The reference clock generation section 107 generates the reference clock clk as a reference used for measuring time, and supplies this reference clock clk to a timepiece function frequency divider 109.

In addition to the reference clock clk, the timepiece function frequency divider 109 receives the phase correction signal c and a frame synchronized state signal h from the bit synchronization section 103 and the control section 108, respectively. The frame synchronized state signal h is identical to the frame synchronized state signal j output from the frame signal detection section 105. When the frame synchronized state signal h indicates a frame step-out state, the timepiece function frequency divider 109 frequency-divides the reference clock clk by a fixed value. When the frame synchronized state signal h indicates a frame synchronized state, the timepiece function frequency divider 109 variably performs frequency division of the reference clock clk in accordance with the phase correction signal c. With this operation, a timepiece frequency division clock g is generated.

The timepiece frequency division clock g has a clock interval of one second (1 Hz), provided that the reference clock clk has a frequency of 38.4 kHz, and the frequency division number is 38,400. The control section 108 uses this timepiece frequency division clock g as a timer, and counts up to a required time, e.g., one minute or one hour, on the basis of this timer, thereby causing the display section 110 to display this time.

Figure 2:
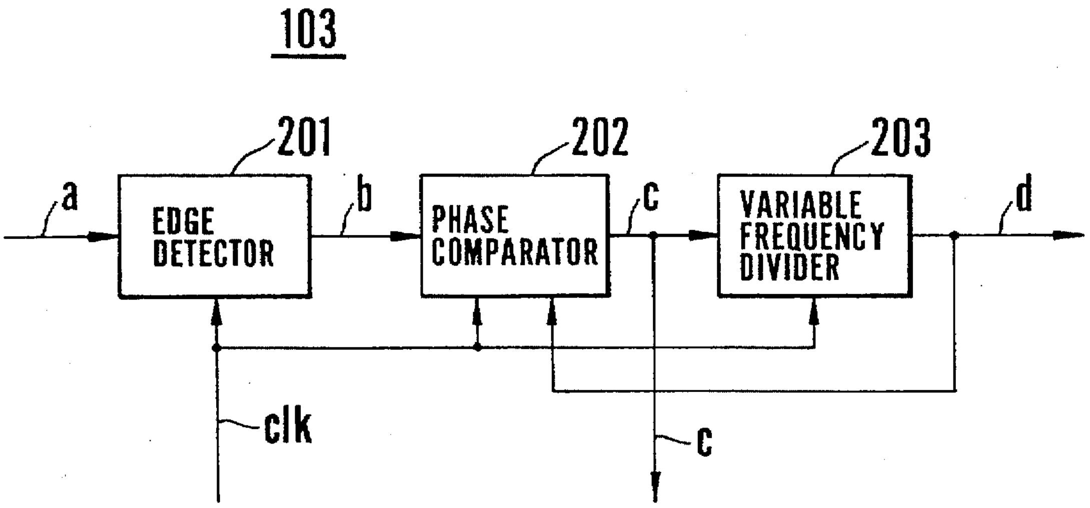
FIG. 2 is a block diagram showing the arrangement of a bit synchronization section 103 used in the embodiment in FIG. 1.

FIG. 2 is a block diagram showing the arrangement of the bit synchronization section 103 used in this embodiment.

In this embodiment, the preamble detection section 104 and the frame signal detection section 105 sample the digital signal a from the reception section 102 at the timing of the trailing edge of the reproduction clock d by using flip-flops and the like, thereby detecting a preamble signal and a frame synchronization signal, respectively. In order to prevent the sampling timing from coinciding with an edge (change point) of the digital signal a, the bit synchronization section 103 establishes bit synchronization of the digital signal a and outputs the resulting reproduction clock d.

An edge detector 201 of the bit synchronization section 103 detects an edge of the digital signal a and generates an edge detection signal b.

A phase comparator 202 compares the phase of the edge detection signal b with that of the reproduction clock d output by itself. If the phase of the reproduction clock d is advanced or leads with respect to that of the edge detection signal b, the phase comparator 202 generates the phase correction signal c for phase advance correction (represented by c+). More specifically, for example, if the edge detection signal b is at "H" level of the reproduction clock d, the phase comparator 202 determines that the reproduction clock d is advanced with respect to an edge of the digital signal a, and generates the phase correction signal c+. If the phase of the reproduction clock d is delayed or lags behind, the phase comparator 202 generates the phase correction signal c for phase delay correction (represented by c−). More specifically, for example, if the edge detection signal b is at "L" level of the reproduction clock d, the phase comparator 202 determines that the reproduction clock d is delayed with respect to an edge of the digital signal a, and generates the phase correction signal c−.

A variable frequency divider 203 is controlled by the phase correction signal c to change the frequency division number of the reference clock clk. Upon reception of the phase correction signal c+, the variable frequency divider 203 decreases the frequency division number to output the reproduction clock d after advancing its phase. Upon reception of the phase correction signal c−, the variable frequency divider 203 increases the frequency division number to output the reproduction clock d after delaying its phase. As a result, the bit synchronization section 103 outputs the reproduction clock d whose leading edge coincides with an edge of the digital signal a, i.e., the reproduction clock d bit-synchronized with the digital signal a.

Assume that the radio selective calling receiver of this embodiment operates at a transmission rate of 1,200 pbs. In this case, if the reference clock generation section 107 is caused to generate a reference clock clk having a frequency of 38.4 kHz, a clock obtained by frequency-dividing the reference clock clk by 32 is considered as one unit bit. The maximum phase difference between the digital signal a and the reproduction clock d is ±½ of a bit (corresponding to 16 reference clocks clk). If, therefore, the unit phase correction amount of the reproduction clock d is set to correspond to one reference clock clk, the bit synchronization section 103 can complete bit synchronization by performing a phase correcting operation 16 times, i.e., performing phase correction with respect to 16 reproduction clocks d.

Figure 4:
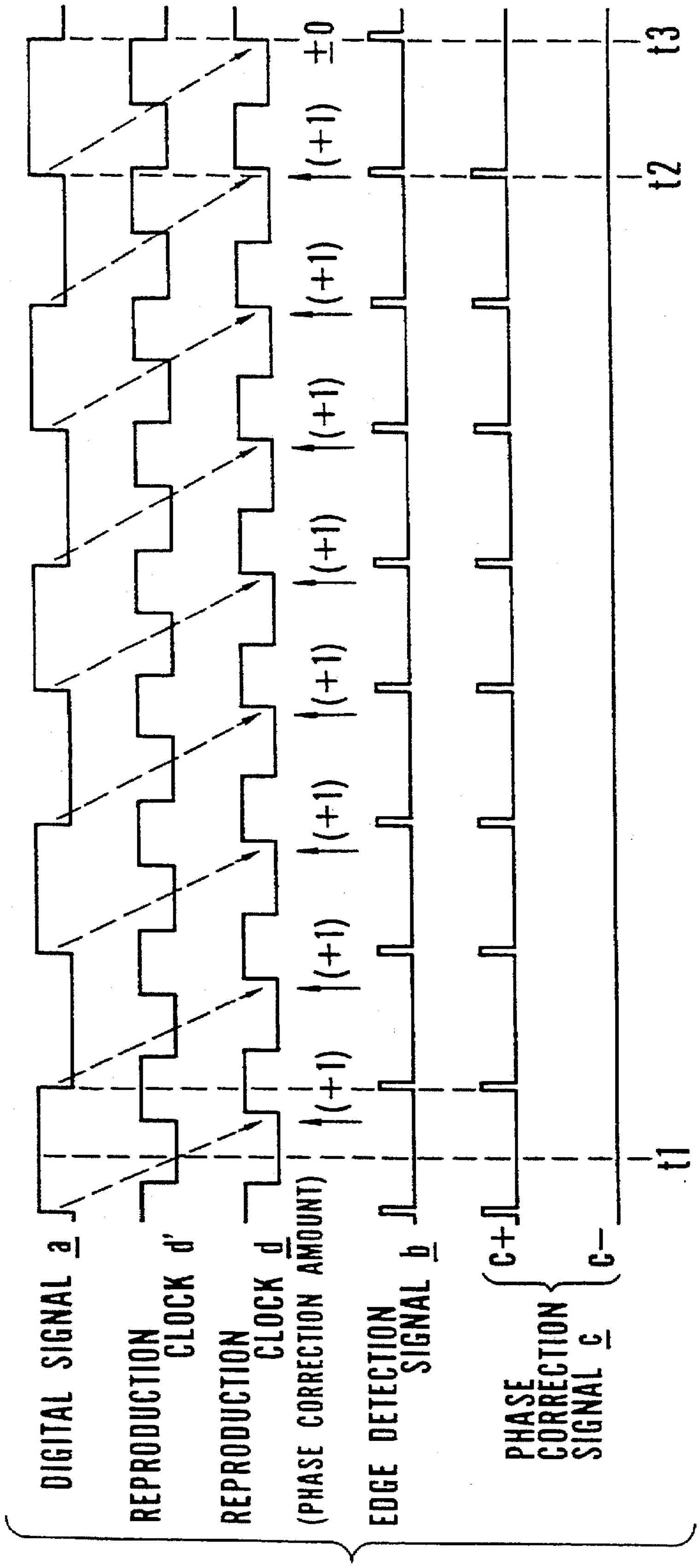

FIG. 4 is a timing chart for explaining a bit synchronizing operation of the bit synchronization section 103 in a state wherein the phase of the reproduction clock d is delayed with respect to that of the digital signal a.

FIG. 4 shows a bit synchronizing operation in a state wherein bit synchronization is not established, and a reproduction clock d' is delayed with respect to the digital signal a by ¼ of a bit. Before time t1, the reproduction clocks d' and d are in phase with each other. At an edge of the digital signal a, the edge detector 201 generates an edge detection signal b as a short pulse. In the interval between time t1 and time t2, eight edge detection signals b coincide with "H" level of the reproduction clock d from the variable frequency divider 203. That is, the phase comparator 202 detects an edge of the digital signal a eight times in this interval. Upon this edge detection based on "H" level, the phase comparator 202 determines that the phase of the reproduction clock d is advanced with respect to the edge detection signal b, and generates a phase correction signal c+ for phase advance correction. Upon reception of the phase correction signal c+, the variable frequency divider 203 decreases the frequency division number to output a reproduction clock d after advancing its phase. By establishing a bit synchronizing operation eight times in the interval between time t1 and time t2, bit synchronization of the reproduction clock d is completed. At time t3 corresponding to the next edge of the digital signal a, the edge detection signal b coincides with the leading edge of the reproduction clock d. Therefore, no phase correction signal c (c+, c−) is output from the phase comparator 202.

Figure 5:
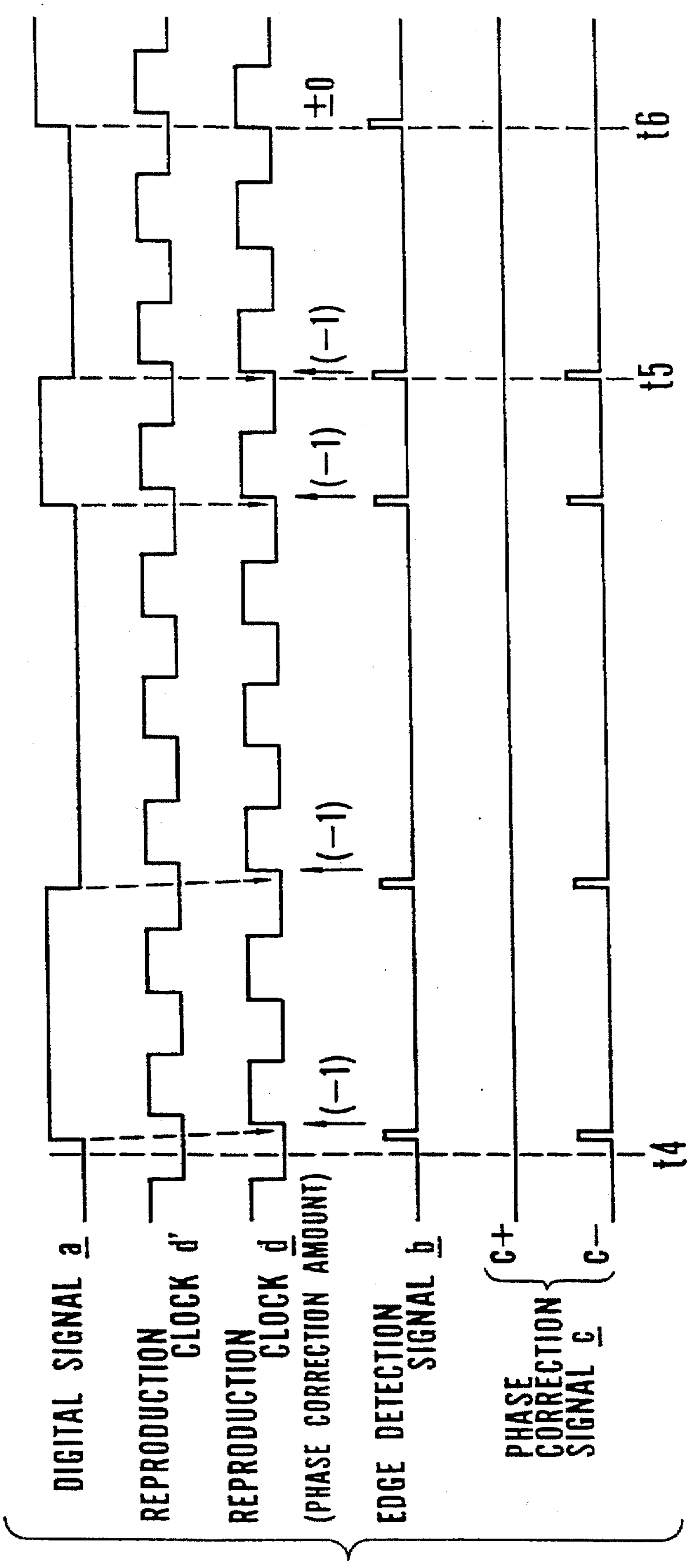

FIG. 5 is a timing chart for explaining a bit synchronizing operation of the bit synchronization section 103 in a state wherein the phase of the reproduction clock d is advanced with respect to that of the digital signal a.

FIG. 5 shows a bit synchronizing operation in a state wherein bit synchronization is not established, and the reproduction clock d' is advanced with respect to the digital signal a by ⅛ of a bit. Before time t4, the reproduction clocks d' and d are in phase with each other. In the interval between time t4 and time t5, four edge detection signals b coincide with "L" level of the reproduction clock d. That is, the phase comparator 202 detects an edge of the digital signal a four times in this interval. Upon this edge detection based on "L" level, the phase comparator 202 determines that the phase of the reproduction clock d is delayed with respect to the edge detection signal b, and generates a phase correction signal c− for phase delay correction. Upon reception of the phase correction signal c−, the variable frequency divider 203 increases the frequency division number to output a reproduction clock d after delaying its phase. By establishing a bit synchronizing operation four times in the interval between time t4 and time t5, bit synchronization of the reproduction clock d is completed. At time t6 corresponding to the next edge of the digital signal a, the edge detection signal b coincides with the leading edge of the reproduction clock d. Therefore, no phase correction signal c is output from the phase comparator 202.

As described with reference to FIGS. 2, 4, and 5, the bit synchronization section 103 performs phasing of the reproduction clock d with respect to the burst-like digital signal a, and absorbs a phase shift of the reproduction clock d caused by an error in the reference clock clk, thereby achieving bit synchronization. That is, a bit synchronizing operation (initial bit synchronizing operation) performed in a frame step-out state corresponds to phasing of a burst signal, and a bit synchronizing operation performed in a frame synchronized state absorbs a phase shift caused by insufficient precision of the reference clock clk.

The precision of the reference clock clk is within ±30 ppm. If this precision is +30 ppm, the phase of the reproduction clock d shifts by 0.5222016 bits of the reference clock clk per batch of the digital signal a. If, therefore, the unit correction amount of the bit synchronization correcting operation corresponds to one reference clock clk, the bit synchronization section 103 performs phase correction of the reproduction clock d once every two batches of the digital signal a.

Figure 3:
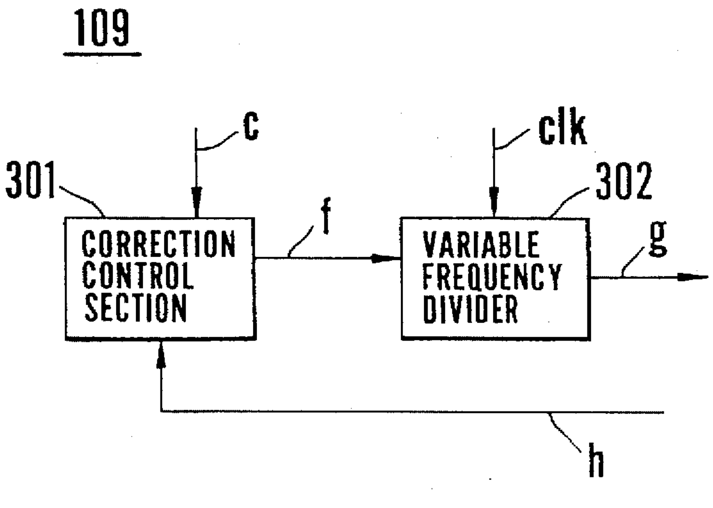
FIG. 3 is a block diagram showing the arrangement of a frequency divider 109 used for timepiece function in the embodiment.

FIG. 3 is a block diagram showing the arrangement of a frequency divider 109 used for the timepiece function in this embodiment.

A correction control section 301 of the frequency divider 109 receives the phase correction signal c from the bit synchronization section 103 and the frame synchronized state signal h from the control section 108. Upon reception of the frame synchronized state signal h indicating that the digital signal a is in a frame synchronized state, the correction control section 301 outputs the phase correction signal c, as a frequency division number correction signal f, to a variable frequency divider 302 without any modification. Note that the frequency division number correction signal f becomes a phase advance frequency division number correction signal f+ when the phase correction signal c is the phase advance correction signal c+, and becomes a phase delay frequency division number correction signal f− when the phase correction signal c is the phase correction signal c−. Upon reception of the frame synchronized state signal h indicating that the digital signal a is in a frame step-out state, the correction control section 301 uses the phase correction signal c as a mask and inhibits the signal c from being output to the variable frequency divider 302. If the frame synchronized state signal h is at "H" level while the digital signal a is in a frame synchronized state, and is at "L" level while the digital signal a is in a frame step-out state, the correction control section 301 can be realized by an AND circuit.

The variable frequency divider 302 receives the frequency division number correction signal f and a reference clock from the reference clock generation section 107. If the frequency division number correction signal f is the correction signal f+, the variable frequency divider 302 adds one to the frequency division number. If the input frequency division number correction signal f is the correction signal f−, the variable frequency divider 302 subtracts one from the frequency division number. If the digital signal a is in a frame step-out state, and the frequency division number correction signal f is not input, the variable frequency divider 302 frequency-divides the reference clock clk by a fixed value. These frequency division results become timepiece frequency division clocks g. For example, the variable frequency divider 302 outputs timepiece frequency division clocks g obtained by frequency-dividing the reference clock clk by 38,400 while the digital signal a is in a frame step-out state, and outputs timepiece frequency division clocks g obtained by frequency-dividing the reference clock clk by 38,400+$\alpha$ ($\alpha$ is an increment/decrement represented by the frequency division number correction signal f) while the digital signal a is in a frame synchronized state. As is known, the variable frequency divider 203 can be realized by a circuit constituted by cascaded flip-flops, an AND circuit, and an OR circuit. The control section 108 counts up time on the basis of the timepiece frequency division clocks g, and displays the measuring time on the display section 110.

As described with reference to FIGS. 1 to 5, the radio selective calling receiver can improve the precision of the timepiece frequency division clock g up to the transmission rate precision of the digital signal a, i.e., the reference clock precision of a base station, by only using the bit synchronization section 103 and the like and adding a digital circuit, which has a simple arrangement and operates at a relatively low frequency, to these circuits. Therefore, the time correction system of this embodiment can reduce the error in the timepiece to a practically negligible degree without requiring any expensive high-frequency signal processing circuit and the like.

In this embodiment, only the time correction system for the radio selective calling receiver of the POCSAG system has been described. However, as is apparent, this time correction system can be applied to a radio selective calling receiver of another system such as the NTT system.

As has been described above, according to the present invention, when a digital signal is in a frame step-out state, a reference clock is frequency-divided by a fixed value. When the digital signal is in a frame synchronized state, the reference clock is variably frequency-divided in accordance with a phase correction signal from the bit synchronization section. Timepiece frequency division clocks are generated from these frequency division outputs. Therefore, the precision of the timepiece can be improved up to the reference clock precision of a paging system base station by only adding a simple, inexpensive circuit for time correction of the timepiece.

What is claimed is:

1. A time correction system for a radio selective calling receiver which receives a radio signal containing at least a preamble signal, a frame synchronization signal, and a selective call signal, performs call indication when the selective call signal coincides with a self-selective call number, and has a timepiece function for displaying time on a display section, comprising:

a reception section for generating a digital signal from the radio signal;

a bit synchronization section for establishing bit synchronization of the digital signal for generating a reproduction clock, and generating a phase correction signal indicating a phase difference between the reproduction clock and the digital signal;

a frame signal detection section for establishing frame synchronization of the digital signal and generating a frame synchronized state signal indicating whether the digital signal is in a frame synchronized state or a frame step-out state;

a reference clock generation section for generating a reference clock;

a frequency divider for said timepiece function for receiving the frame synchronized state signal, frequency dividing the reference clock by a fixed value when the frame synchronized state signal indicates that the digital signal is in a frame step-out state, and variably frequency dividing the reference clock in accordance with the phase correction signal when the frame synchronized state signal indicates that the digital signal is in a frame synchronized state, thereby setting frequency division outputs as timepiece frequency division clocks; and a time display driving section for causing said display section to display time based on the timepiece frequency division clocks, said frequency divider synchronizing said reference clock based on said frame synchronization state signal and correcting a phase of said reference clock based on said phase correction signal and outputting a phase corrected, synchronized timepiece clock signal as said timepiece frequency division clocks to said display section, said system further comprising data selecting means for synchronizing said digital signal based on said frame synchronization state signal and correcting a phase of said digital signal based on said phase correction signal and outputting a phase corrected, synchronized data signal to said display means.

2. A system according to claim 1, wherein said bit synchronization section includes:

an edge detector for detecting an edge of the digital signal and generating an edge detection output;

a phase comparator for comparing a phase of the edge detection output with that of the reproduction clock, generating the phase correction signal for phase advance correction when the phase of the reproduction clock is advanced, and generating the phase correction signal for phase delay correction when the phase of the reproduction clock is delayed; and a first variable frequency divider for decreasing a frequency division number upon reception of the phase correction signal for phase advance correction, and increasing the frequency division number upon reception of the phase correction signal for phase delay correction.

3. A system according to claim 1, wherein said frequency divider for timepiece function includes:

a correction control section for receiving the frame synchronized state signal and the phase correction signal and outputting the phase correction signal only when the frame synchronized state signal indicates that the digital signal is in a frame synchronized state; and a second variable frequency divider for decreasing the frequency division number for the reference clock upon reception of the phase correction signal for phase advance correction from said correction control section, increasing the frequency division number for the reference clock upon reception of the phase correction signal for phase delay correction from said correction control section, and frequency-dividing the reference clock by a fixed value when the phase correction signal is not received.

4. A system according to claim 1, wherein said reception section intermittently receives power at all times except after detection of the preamble signal.

5. A time correction system for a radio selective calling receiver comprising:

means for receiving a radio signal and generating a digital signal;

means for synchronizing connected to said receiving means;

means for selecting data from said digital signal;

means for displaying connected to said data selecting means;

means for generating a reference clock signal, connected to said synchronizing means; and means for producing a timepiece clock signal connected to said reference clock signal generating means, said synchronizing means and said displaying means, said selecting means outputting a frame synchronization state signal to said timepiece clock signal producing means, said synchronizing means outputting a phase correction signal to said timepiece clock signal producing means and said reference clock signal generating means outputting a reference clock signal to said timepiece clock signal producing means;

said timepiece clock signal producing means synchronizing said reference clock signal based on said frame synchronization state signal and correcting a phase of said reference clock signal based on said phase correction signal and outputting a phase corrected, synchronized timepiece clock signal to said display means, and said data selecting means synchronizing said digital signal based on said frame synchronization state signal and correcting a phase of said digital signal based on said phase correction signal and outputting a phase corrected, synchronized data signal to said display means.

6. The time correction system as in claim 5, wherein said receiving means comprises an antenna, an amplifier and a demodulator.

7. The time correction system as in claim 5, wherein said radio signal has a first frequency, said frame synchronization state signal having a second frequency less than said first frequency, and said phase correction signal having a third frequency less than said first frequency.

8. The time correction system as in claim 5, wherein said digital signal includes at least one of a preamble signal, a frame synchronization signal and a selective call signal.

9. The time correction system as in claim 5, wherein said synchronizing means comprises a bit synchronization circuit.

10. The time correction system as in claim 9, wherein said synchronizing means includes an edge detector, a phase comparator connected to said edge detector and a variable frequency divider connected to said phase comparator.

11. The time correction system as in claim 5, wherein said data selecting means includes:

a preamble detection circuit connected to said receiving means, a frame signal detection circuit connected to said receiving means, a check circuit connected to said receiving means, and a control section connected to said receiving means, said preamble detection circuit, said frame signal detection circuit and said check circuit.

12. The time correction system as in claim 11, wherein said control section includes a read only memory, a microprocessor and a random access memory.

13. The time correction system as in claim 11, wherein said preamble detection section includes a series of flip-flops and said frame signal detection section includes a series of flip-flops.

14. The time correction system as in claim 5, wherein said timepiece clock signal producing means frequency divides said reference clock signal by a predetermined value when said frame synchronization state signal indicates a frame step-out state.

15. The time correction system as in claim 5, wherein said timepiece clock signal producing means frequency divides said reference clock signal according to said phase correction signal when said frame synchronization state signal indicates a frame synchronized state.

16. The time correction system as in claim 5, wherein said timepiece clock signal producing means comprises a timepiece function frequency divider circuit.

17. The time correction system as in claim 5, wherein said timepiece clock signal producing means includes a correction control circuit and a variable frequency divider connected to said correction control circuit.

18. The time correction system as in claim 17, wherein said correction control circuit comprises an AND circuit.

19. The time correction system as in claim 17, wherein said frequency divider circuit comprises at least one of cascaded flip-flops, an AND circuit and an OR circuit.

20. The time correction system as in claim 5, wherein said clock signal has a frequency of 38.4 kilohertz and said timepiece clock signal producing means frequency divides said clock signal by $38.400+\alpha$, where $\alpha$ corresponds to said phase correction signal.

* * * * *